Sept. 20, 1971 J. T. DOTY 3,605,530
MOBILE FIELD LATHE
Filed Nov 29, 1968 4 Sheets-Sheet 1
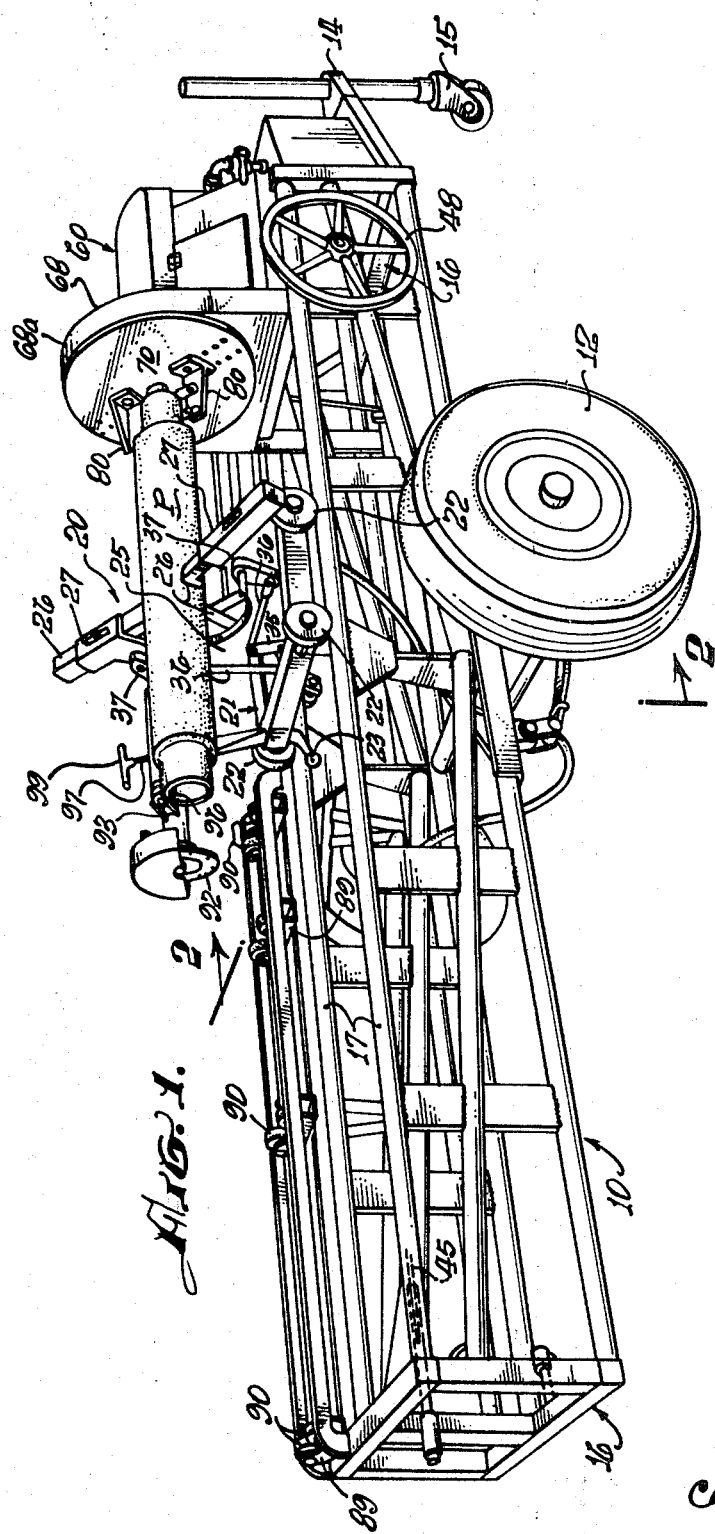
INVENTOR.
JOHN T. DOTY,
By Forrest J. Lilly
ATTORNEY.

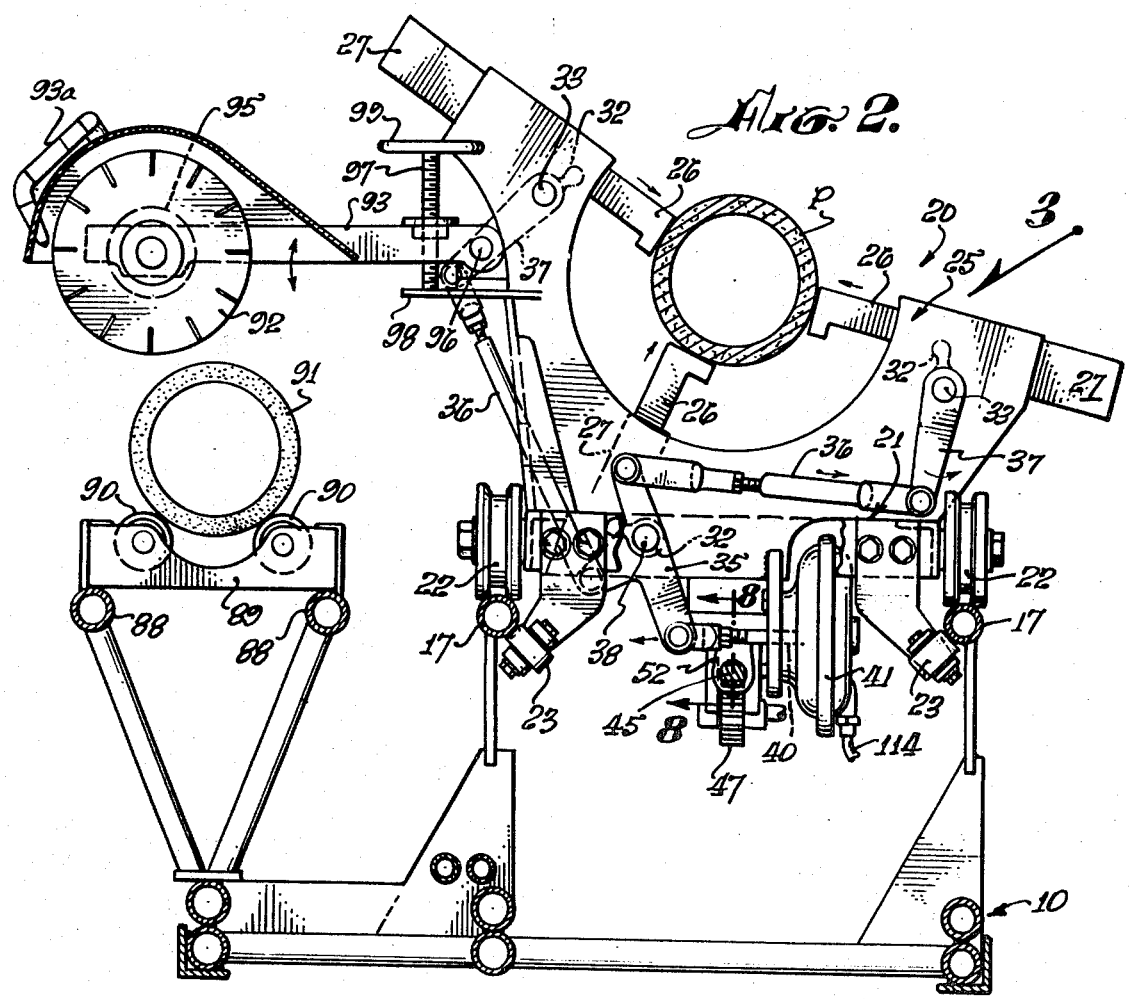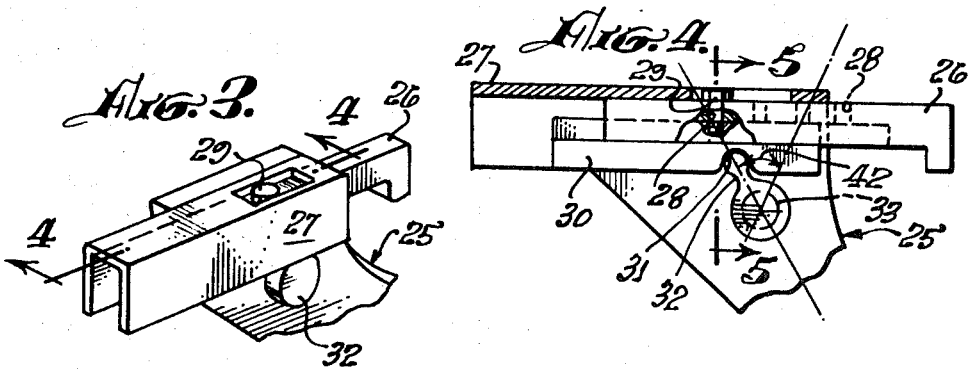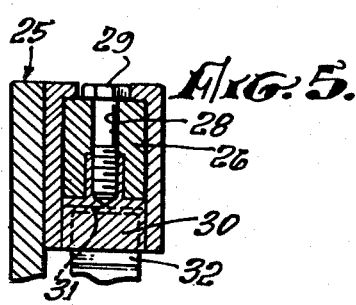

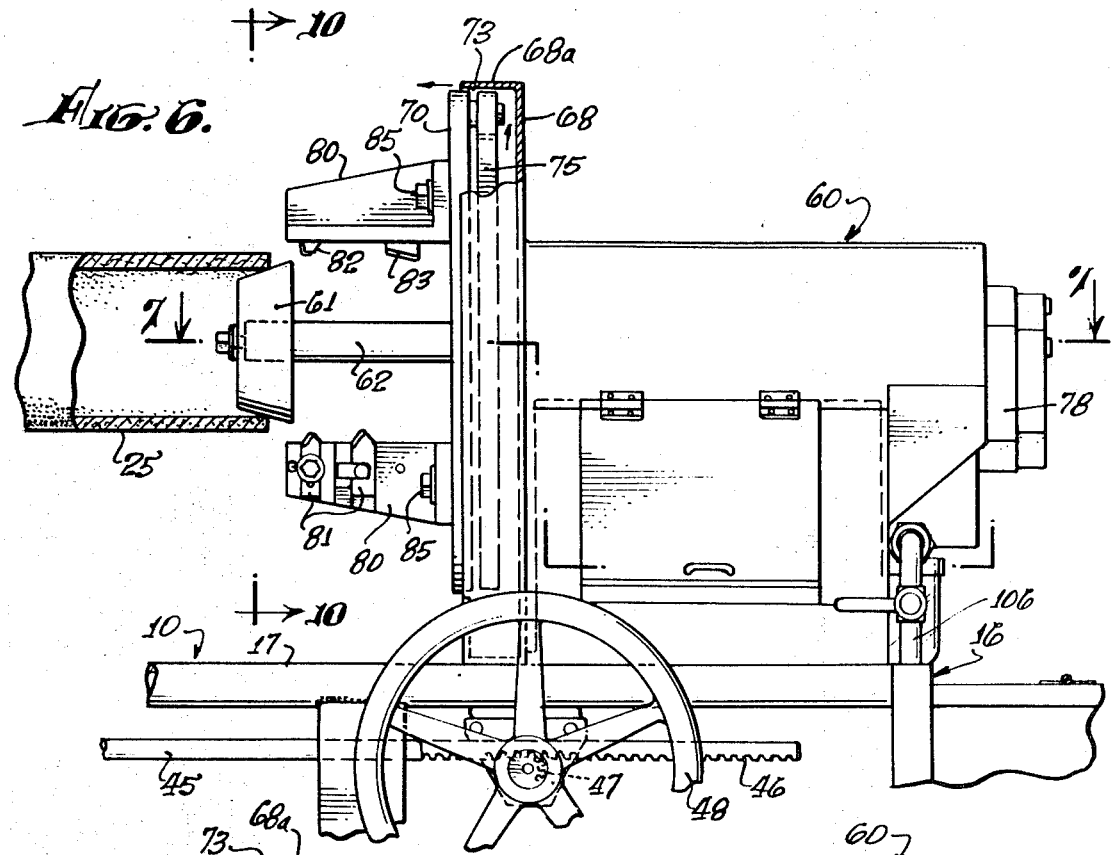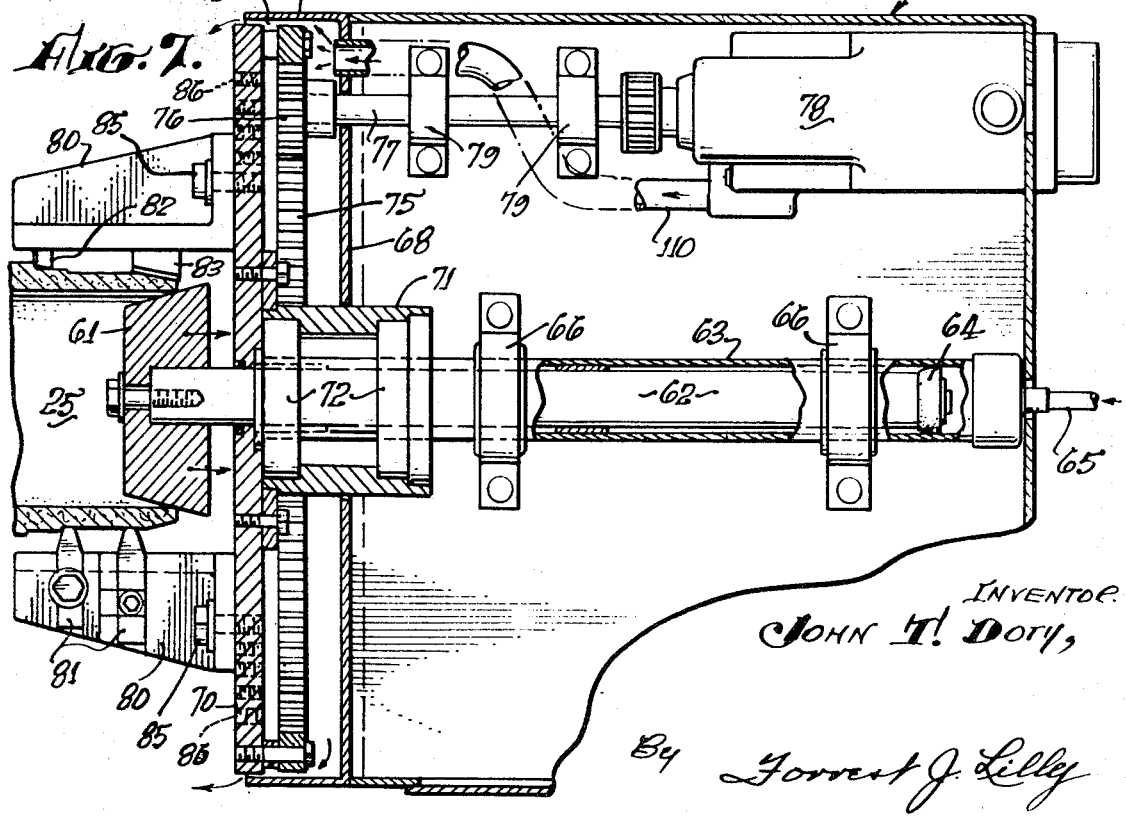

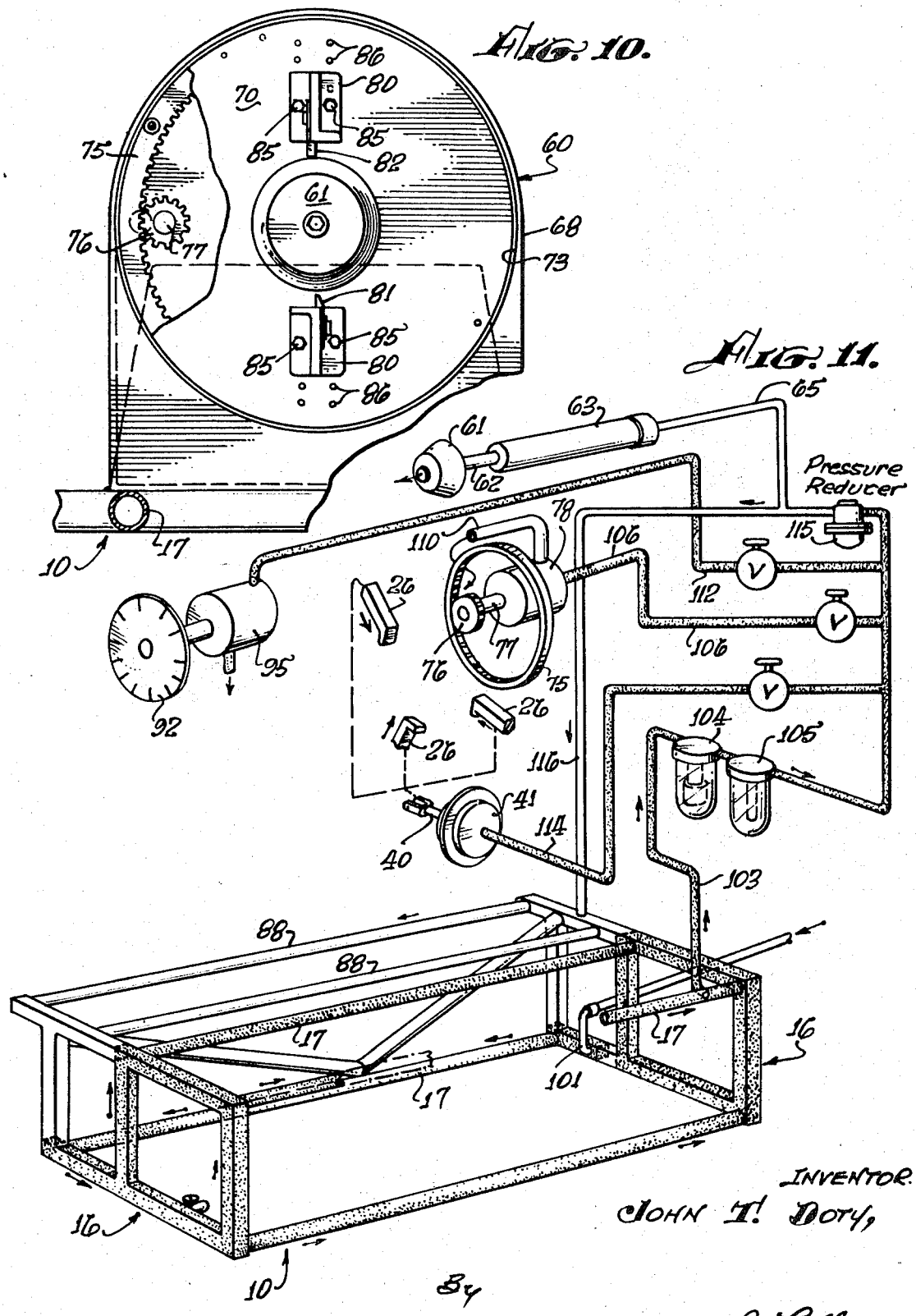

United States Patent Office 3,605,530
Patented Sept. 20, 1971

3,605,530
MOBILE FIELD LATHE
John T. Doty, 2238 E. 21st St., Long Beach, Calif.
Filed Nov. 29, 1968, Ser. No. 779,786
Int. Cl. B23b 5/16
U.S. Cl. 82—4C
13 Claims

ABSTRACT OF THE DISCLOSURE

A mobile field lathe operated by compressed air has been designed particularly for cutting and machining operations on asbestos cement pipe. It has been found advantageous to cut pipe to length and to machine the ends on the pipe at the job site as this operation makes possible various economies in pipe layout, elimination of more expensive types of pipe, salvaging broken pipe, and so on. Mobility permits the unit to follow along as pipe is laid.

BACKGROUND OF THE INVENTION

The present invention relates generally to machine tools of the lathe type and is more especially concerned with a mobile lathe designed to be used in the field at the job site for cutting and finishing asbestos cement pipe. However, it will be realized that in the broader sense of the invention, it is not limited to any particular type of pipe or other article operated on in the lathe.

Asbestos cement pipe is a hard, brittle mixture of cement and asbestos fibers and presently finds an extensive area of use in water supply systems, both for domestic supply and irrigation. According to current practice, the pipe is supplied in a range of standard inside diameters from three inches upwardly to thirty-six inches, while the standard length of pipe is thirteen feet. The pipe is manufactured by placing a moist mixture of cement and asbestos over a smooth core or mandrel, after which the mixture is allowed to dry and harden. The inside of the pipe is normally formed to relatively accurate dimensions when manufactured by this process; but the outside diameter is variable because of variation in wall thicknesses. For this reason, the outside surface of the pipe may not be truly circular in cross section. Wall thicknesses range normally from about three-fourths inch to more than two inches for the larger sizes of pipes.

After hardening, each length of pipe is manufactured with a specially milled end which has been finished to a close tolerance in order to receive and seal against a rubber O-ring. The adjoining section of pipe is then connected by means of a collar coupling which is placed over the O-ring to produce a water-tight connection.

Pipe manufacturers supply pipe in standard thirteen foot lengths at a base price which represents the minimum cost of pipe per linear foot. In addition, certain semistandard pipes are provided at a substantial premium over the base price. These may be half-lengths, that is, six and one-half foot lengths, or they may be lengths having an overall smooth outer surface which has been milled or machined to a relatively accurate but smaller diameter than that of the standard pipe. Milled pipe of this last mentioned kind is used for particular purposes, a typical use being to effect a field closure between two previously laid sections of pipe. In this case, the milled pipe is cut to an exact length required to fit the closure; but it has then been common practice to place the bevel on the pipe by hand tools.

It has been found to be expensive, time consuming, and cumbersome from the standpoint of delivery, ordering, inventory, and layout of a pipeline to work within the comparatively rigid limits imposed by current standards of pipe lengths available. Much greater flexibility can be obtained in planning and laying out a pipeline when the pipeline can be planned independently of the need for accommodating the layout to fixed standard lengths of pipe. In other words, when pipe can be cut to any length readily at the job site, several economies arise, both because less expensive pipe can be utilized and also because time can be saved in the pipeline laying operations. This last item is a big consideration to a pipelines contractor because in contracting, unforeseen delays are one of the biggest enemies of profitable operations.

Since the angle between adjoining pipe segments is limited to 5° with couplings of the type now available, the ready availability of short lengths of pipe permits installation of a curve in a pipeline of shorter radius than when standard lengths of pipe are used. This also allows trench widths to be kept to a minimum around curves and reduces excavating costs, back-filling costs, and various other costs.

The availability of short lengths cut on the job site often makes it possible to bypass quickly unforeseen obstructions.

Although the asbestos cement pipe has sufficient strength to resist internal water pressure, it is comparatively brittle and may crack when subjected to external loads. The possibility of such damage to pipe can be markedly reduced in fills and hillside areas where soil movement may occur, by using a larger number of short pipe sections so that soil settlement can be taken up by angular movement at the pipe joints or couplings.

Also, the possibility of field machining operations enables odd lengths and broken lengths of pipe to be salvaged by cutting off broken ends and milling new tapered fittings on the ends.

Thus, it becomes a general object of the present invention to provide a mobile lathe which is adapted to cutting and finishing operations at the job site and can follow along a pipe line being laid in order to cut and mill the ends of asbestos concrete pipe.

A more particular object of the present invention is to provide a mobile lathe of this type for operations on pipe which lathe is simple in construction and design and economical in operation.

It is also an object of the present invention to provide a lathe of novel construction for field operations on asbestos concrete pipe which is powered by compressed air, thereby eliminating the need for supply of electrical power and the hazards incidental thereto when operating in wet ground.

SUMMARY OF THE INVENTION

The present invention is characterized by a load carrying frame having a plurality of hollow structural members of which the interiors are interconnected to form a continuous air passage which is connected to a source of compressed air. Air is then supplied from this air passage to motors mounted on the frame, one of which drives a cutoff saw and the other of which drives tools surfacing the end of a piece of pipe. The interior of the frame constitutes an air reservoir and moisture trap from which condensed moisture can be bled periodically.

Structural elements of the frame provide a pair of horizontally extending rails on which is mounted a carriage for supporting a length of pipe during the milling operation. Cutters for performing the milling are carried on a face plate rotating about an axis concentric with the work. The carriage is provided with means for centering the length of pipe and the end of the pipe is supported concentrically of the face plate by a centering cone which is provided with an air spring designed to exert a substantially constant pressure against the end of the pipe.

The centering device on the carriage and the tool posts on the face plate are both provided with adjustment means whereby the pipe jaws or the tools can be mounted in any selected one of a series of spaced positions which accommodate the pipe jaws and the tools to the standard increments in diameter of pipe sizes.

Since the dust from the cutting and milling operations is extremely abrasive, the drive elements for the face plate are enclosed in a housing of which the face plate is, in effect, a part. One wall of the housing surrounds the face plate at the periphery with relatively small clearance. Compressed air is introduced into the housing to maintain superatmospheric pressure within the housing and the air escaping through the clearance around the face plate prevents entry of abrasive particulate matter into the housing. In a preferred embodiment, this air introduced into the housing is exhaust air from a motor driving the face plate and oil vapor previously introduced into the air is used to lubricate the drive gears for the face plate by directing the exhaust from the motor against the driving gears.

A second reservoir is preferably provided in the interior of a portion of the frame, similar to the first described air passage, and this second air reservoir or passage is connected to provide an air spring on the centering cone. Thus, movement of the cone during the milling operation does not build up air pressure in opposition to the movement, and the force exerted on the pipe by the cone is maintained substantially constant.

BRIEF DESCRIPTION OF THE DRAWINGS

The nature of the present invention will be more easily comprehended by reference to the following description, and to the annexed drawing, in which:

FIG. 1 is a perspective view of a field lathe embodying the present invention;

FIG. 2 is a vertical transverse section through the field lathe, substantially on line 2—2 of FIG. 1;

FIG. 3 is a fragmentary side and top perspective of one of the pipe jaws, as indicated by the arrow 3 in FIG. 2;

FIG. 4 is a vertical median section through a pipe jaw as on line 4—4 of FIG. 3;

FIG. 5 is a fragmentary vertical section on line 5—5 of FIG. 4;

FIG. 6 is a fragmentary side elevation of a portion of the field lathe, showing the housing with the face plate and the motor driving the face plate;

FIG. 7 is an enlarged horizontal median section through the face plate and housing therefor on line 7—7 of FIG. 6;

FIG. 8 is a fragmentary elevation of section illustrating the clamp and lever means for advancing the carriage during the milling operation, taken substantially on line 8—8 of FIG. 2;

FIG. 9 is a combined fragmentary elevation and section on line 9—9 of FIG. 8;

FIG. 10 is a front elevation of the face plate and the tool posts thereon, on line 10—10 of FIG. 6; and FIG. 11 is a diagram of the compressed air system of the field lathe.

DESCRIPTION OF A PREFERRED EMBODIMENT

Referring now to the drawing, and more particularly to FIG. 1, there is shown the field lathe embodying the present invention which includes a box frame indicated generally at 10 supported on an axle extending between a pair of ground engaging wheels 12, thus providing mobility to the complete field and lathe. The front end of the frame is provided with a tow-bar 14 for connection to a towing vehicle and also with a dirigible wheel assembly 15 for supporting the front end of the frame when not connected to a towing vehicle.

Frame 10 has a plurality of hollow structural members which are rigidly interconnected in order to form a load supporting structure upon which are mounted means for holding a length of pipe during cutting and finishing operations, as will be more fully described. No particular design or arrangement of these structural elements is required but from FIG. 1, it will be noticed that these structural members provide at each side of the frame a truss which extends front to rear, the two trusses being interconnected at their ends by transversely extending members 16 at the front and rear of the frame.

Two of the frame members are longitudinally extending tubular rails 17 on which the pipe supporting carriage, later described, is mounted for movement along the frame.

Not necessarily all, but preferably the major structural members of the frame are hollow or tubular members. These are welded or otherwise connected together in such a manner that the interior spaces of a plurality of these members form a continuous air passage within the frame. Preferably, as will be further explained, there are two such continuous air passages within the frame, separated from each other so that one may hold air at a relatively high pressure and the other air at a relatively low pressure, both above atmospheric. The general nature and extent of these to passages are illustrated diagrammatically in FIG. 11 in which the members providing the high pressure passage are indicated by stippling, while the members providing the low pressure passage are unshaded.

Thus, the interior spaces of the structural members of the frame provide two separate air chambers or reservoirs which are part of the air supply system. By utilizing the major members, a passage of considerable volume can be provided for each of these two compartments. By way of example, a frame twelve feet long, four feet wide, and three feet high, may provide as much as 150 linear feet of tubing, which can be interconnected to form these two air passages.

Above frame 10 and supported on parallel rails 17 for movement therealong is the pipe carriage indicated generally at 20. This carriage is shown particularly in FIG. 2. It comprises a truck 21 having four wheels 22 that roll along the two parallel rails 17. Four auxiliary holddown rollers 23 engage the under sides of rails 17 to hold the carriage from displacement off the rails.

Mounted on carriage 20 is a generally semi-circular frame plate 25 which is a support for a plurality of pipe engaging jaws 26. There are three of these jaws as shown in FIG. 2, and they are adapted not only to clamp and hold a length of pipe P during a milling operation, but are also designed to center the pipe with respect to the cutting tools, as will be more fully explained hereinafter. The center jaw 26 is placed underneath the length of pipe to support it, while the other two jaws, opposing each other, are positioned to engage the pipe slightly above the full diameter and thus exert a holding force on the length of pipe which has a downward component. Typically, the opposing jaws are located approximately 100° on each side of the center jaw so that the smaller angle above and between the two opposing jaws is approximately 160°. It will be realized that these angle values are typical and not limitative upon the spacing between the three jaws.

Each jaw 26 is slidably mounted in a guide or holder 27, as shown in FIGS. 3 and 4. Means are provided for locating the jaw, when fully retracted in the associated holder, at a selected one of a plurality of spaced positions. This is accomplished typically by providing in the jaw a plurality of spaced holes 28 each adapted to receive a machine screw 29 or other fastening means for connecting the jaw to base 30. Since pipes to be held by the jaws have different standard diameters which differ by known increments, the spacings between the successive holes 28 are determined by these diameters of the pipes.

Each jaw 26 moves toward and away from pipe P in a direction that is radial of the pipe and its longitudinal axis. This movement of the jaw is controlled and directed by stationary holder 27 which acts as a guide, the holder being in the form of an inverted channel as may be seen from FIGS. 3 and 5. The three jaws holders 27 are welded or otherwise suitably fastened to frame 25.

The means for moving jaws 26 toward and away from the pipe includes a base or slide 30 associated with each jaw 26. The base 30 is provided with a single tapped hole to receive machine screw 29 so that the base is fastened to the jaw and moves in holder 27 with the jaw. The under side of base 30 is recessed at 31 to receive a short rounded lever 32 pivotally mounted by a pin at 33 in frame 25.

Levers 32 are all at one face of plate 25; and on the opposite face of the frame plate, all the levers are connected together by actuating means providing for equal and simultaneous rocking of levers about the axes of their respective pivots 33.

This actuating means comprises bell crank 35, two arms of which are pivotally connected to connecting rods 36. These two connecting rods are in turn fastened at their other ends to lever 37 which rock pivots 33. The lever 32 for the center or bottom pipe jaw 26 is connected directly to the pivot pin 38 by which bell crank 35 is pivotally mounted on truck 21.

One arm of bell crank 35 is pin-connected to connecting rod 40, the other end of which is attached to the movable diaphragm of air cylinder 41. When air under pressure is admitted to cylinder 41, connecting rod 40 moves to the left, when viewed in FIG. 2, thereby rocking bell crank 35 clockwise. This movement is transmitted through the linkage just described to the three levers 32 which rock angularly through some angle as indicated at 42 in FIG. 4 to advance jaws 26 simultaneously and equally toward the axis of pipe P. This action holds the pipe firmly in the proper position for machining operations. This mechanism causes all of the levers 32 to be rocked through approximately the same angle, regardless of pipe size, to advance and retract jaws 26. Thus, although the range of jaw travel is independent of the pipe diameter, the jaws are changed in starting position to accommodate different diameters of pipes by connecting the jaws to the base slides 30 at an appropriate hole 28.

The means for advancing the carriage and the pipe thereon toward the cutting tool, to be described, is manually operated. Such means comprises a draw bar 45, shown in FIGS. 6 and 8, which is mounted in frame 10 for longitudinal axial movement. The draw bar has at one end a rack 46 which engages pinion 47 fastened to the same shaft that carries hand wheel 48 whereby manual rotation of the hand wheel shifts rack 46 and the attached draw bar in one direction or the other, depending upon the direction of rotation of the hand wheel. Carriage 20 is releasably clamped to the draw bar by a lock mechanism illustrated in FIG. 8. On the under side of truck 21 of the carriage, there is mounted by means of angles 50, bracket 51. Pivotally mounted on bracket 51 are a pair of lock plates 52. The two plates 52 have aligned openings through which draw bar 45 passes, the openings in the plates being of larger diameter than the draw bar so that when the plates are moved into substantially parallel position, indicated by dotted lines in FIG. 8, the draw bar can move freely with respect to the plates. In this position, the lock mechanism is released and the carriage is not clamped to the draw bar 45.

Spring 53 bears at its two ends against the two lock plates 52, normally forcing them to swing away from each other about their pivotal connections to bracket 51 into the solid line position shown in FIG. 8, which is the locking position. When in this position, the two plates are canted or inclined with respect to draw bar 45 and the carriage is locked to the draw bar for movement in either direction.

The clamp is released by manually raising handle 55 from the solid line position to the dotted line position. The handle is pivotally connected to bolt 56 which passes through the two plates and has a nut or other type of keeper on one end which bears against one of the plates 52. The end of the handle is provided with a cam surface which bears against the other plate; and as a consequence of this arrangement, moving the handle upwardly into the dotted line position of FIG. 8 draws the two plates 52 together from the full line position to the dotted line position against the force exerted by spring 53, thus releasing the clamp and disconnecting the carriage from draw bar 45.

The assembly for mounting and driving the cutting tools for milling the ends of the pipe P is mounted on the forward end of frame 10 and includes housing 60. The details of this assembly and the mounting means therefor are shown particularly in FIGS. 6, 7, and 10.

The length of pipe is supported at its forward end adjacent the cutting tools by cone 61. A supply of cones of different diameters are provided with the lathe in order to accommodate pipes of different inside diameters, since the cone enters and supports the forward end of the pipe as shown particularly in FIGS. 6 and 7. The cone thus engages the inside diameter of the pipe, which is normally a truly cylindrical surface and positions the pipe with respect to this surface.

The cone is mounted on one end of piston 62 which reciprocates within cylinder 63, the piston being provided at its inner end with leather cup 64 or similar air sealing means. Air under pressure is supplied to the end of cylinder 63 through conduit 65, as will be further explained. Cylinder 63 is mounted upon the lathe frame by a pair of brackets 66 which hold the cylinder fixed in position. Thus, piston 62 is free to move axially along its own axis and, as will be further seen, this is the axis about which the cutting tools revolve. When mounted on cone 61, pipe P has the longitudinal axis of the inner surface coincident with the axis of cylinder 62 and the axis of revolution of the cutting tools; and, consequently, cone 61 has a centering function in addition to its function of merely supporting the forward end of the pipe P.

At the end adjacent pipe P, housing 60 has an enlarged portion 68 which is circular in cross section and is open at one side. In this portion 68 of the housing is located face plate 70 which closes the open side of housing 68 and so becomes, in effect, a side of the housing. Face plate 70 is carried by hub 71 which in turn is rotatably mounted upon bearings 72 mounted on cylinder 63. Thus, face plate 70 is so mounted that it revolves about the axis of cone 61 and the length of pipe P.

The diameter of face plate 70 is slightly less than the inside diameter of the annular wall 68a, thereby leaving a clearance 73 around the face plate between its periphery and housing wall 68a. Thus, face plate 70 closes the open side of the housing section 68 except for the clearance 73 which provides an opening for exhausting air from the interior of housing section 68, as will be further explained. Inside the housing 68, ring gear 75 is attached to one side of face plate 70. This ring gear meshes with drive pinion 76 fastened on the output shaft 77 of air motor 78. The air motor is mounted within housing 60; and bearings are provided at 79 for the output shaft 77.

On the outside of face plate 70 are mounted one or more tool posts 80. It is evident that any suitable type of cutting tool may be mounted on these tool posts; but as exemplary of such tools, it will be noticed in FIG. 7 that the lower tool post 80 is provided with a pair of cutting tools 81 which cut a cylindrical surface on the end of the pipe. The upper tool post 80 is provided with a tool 82 for making a roughing cut on the pipe ahead of the finish cut made by tools 81; and on the same tool post is mounted the bevel cutting tool 83 which tapers the outer surface of the pipe immediately adjoining the end thereof.

Tool posts 80 are adjustably and removably mounted on face plate 70 by any suitable means, as for example by machine screws 85 which are threaded into tapped holes 86 in the face plate. Holes 86 are arranged in radially spaced positions so that the tool posts 80 can be mounted on the face plate at any selected one of several spaced locations in order to accommodate different diameters of pipe. The spacings between successive holes 86 are determined by the increments in the various standard sizes of pipe.

The field lathe is equipped to cut pipe to length as well as to finish the end of a piece of pipe. Accordingly, a pair of upper rails 88 of frame 10 are utilized as supports for a cradle 89 which includes a plurality of pairs of rolls 90. A pipe 91 resting on rolls 90 can be rotated in order to cut through the pipe wall with a disc-type saw blade 92 mounted on a swinging arm 93. The cutoff saw 92 is driven by air motor 95, the saw being directly mounted on the output shaft of the motor.

Saw blade 92 is mounted to swing in a vertical arc, arm 93 being pivotally connected at 96 to a bracket on frame 10. The saw is raised and lowered manually by handle 93a. The range of downward travel into cutting position is limited by means of a lead screw 97 passing through a nut on the arm and bearing against a fixed abutment 98 attached to the frame. The lead screw can be turned in either direction to raise or lower the cutting position of the saw, as desired, by hand wheel 99.

In operation, saw blade 92 is lowered slowly to make an initial cut through the wall of the pipe 91, bringing lead screw 97 against stop 98, after which the pipe is rotated about its own axis on rollers 90 to continue the cut around the entire circumference of the pipe.

For both safety and convenience, the two motors driving the cutoff saw and the finishing tools are driven by compressed air. Power to drive these motors is supplied by a compressed air system which is shown diagrammatically in FIG. 11, the system also being used to power other elements of the lathe.

As described hereinabove, structural members of frame 10 are hollow and are interconnected in such a manner that the interior spaces of the members provide at least one, and preferable two, continuous but independent air passages within the frame. One of these passages, constituting the primary or high pressure passage comprises a major portion or number of frame elements, typically those indicated by stippling in FIG. 11. The secondary or low pressure air passage or compartment is indicated in FIG. 11 by members which are not shaded and has a smaller volume.

The primary air passage is connected to a suitable source of compressed air, not shown on the drawing. This source is typically a mobile air compressor supplying air at a pressure of 100–125 p.s.i.g. Air from such a source is introduced into the high pressure compartment at an inlet connection 101.

The high pressure air passage in frame 10 serves primarily as a moisture trap. The atmosphere normally contains an appreciable amount of moisture; and under many operating conditions, the humidity is relatively high. For this reason, the air compressor normally delivers hot, moist air to the high pressure passage in the frame. The passage of the compressed air through the tubular frame cools this hot air because of the large radiating surface of the frame, compared with the volume of the passage; and, as a consequence, acts as an effective condenser to condense and remove the moisture. This condensed moisture collects at the bottom of the air passage and can be removed periodically by opening a bleed or blow-off valve at a low point in the high pressure air passage. Without such means for removing moisture from compressed air, the lathe would require excessive maintenance, because this moisture would then be delivered to the air driven motors and other parts of the apparatus.

Means for supplying high pressure air to the two motors include conduit 103, which forms an outlet from the high pressure air passage and is preferably at a high point on the frame to minimize moisture pickup. Conduit 103 leads the high pressure air in succession through water trap 104 and oiler 105. Trap 104 functions in a well known manner to catch any condensate that may be carried out of the high pressure compartment by air leaving through duct 103. Oiler 105 adds to the compressed air stream atomized lubricant which is utilized to lubricate the moving parts of the two air motors.

From main duct 103, air goes to motor 78 through a valved branch duct 106. Motor 78 drives the face plate and the cutting tools mounted thereon. The exhaust from motor 78 passes through exhaust air duct 110 through the rear wall of housing 68 and into the interior of the housing 68. This maintains the interior of housing 68 at a pressure above atmospheric so that the air flow is outwardly of the housing through any cracks or openings. Mainly, air is discharged from the interior of housing 68 through clearance 73 around face plate 70. This provides an air screen at the principal opening into the housing and the direction of air flow is such to prevent entry of particulate matter caused by the action of the cutting tools on the pipe. The particles of asbestos cement are particularly abrasive and would wear the metal parts very rapidly. However, the superatmospheric pressure within housing 68 keeps gears 75 and 76 clean and thus greatly prolongs their life.

Since the exhaust air from motor 78 moving through duct 110 carries with it some atomized lubricant, the terminus of duct 110 is so located as to direct the stream of air issuing from the end of duct 110 onto the two meshing gears 75 and 76. Lubricant in the air stream is thus deposited upon these gears and provide lubrication for them, eliminating the need for any further system of oiling.

A second valve branch air duct 112 is connected to the main supply line 103 and leads to air motor 95. Air from this motor is exhausted to the atmosphere.

A third high pressure branch line 114, controlled by a manual valve, connect main duct 103 with air cylinder 41. When air under pressure is admitted to cylinder 41, jaws 26 are moved, through the agency of the jaw actuating means, into clamping engagement with the pipe P.

Duct 103 leads to the inlet of pressure reducer 115, the outlet of which is connected by duct 116 to the secondary or low pressure air passage in frame 10. The outlet side of the pressure reducer is also connected by line 65 to one end of cylinder 63. Air under pressure in cylinder 63 exerts a force on the end of piston 62 which normally urges the piston outwardly to the position of FIG. 6. This is the position at which a piece of pipe to be finished first engages cone 61 before the pipe is advanced into contact with the cutting tools.

As the carriage 20 is moved to the right in FIG. 1, pipe P is advanced from the position of FIG. 6 into contact with the cutting tools, as shown in FIG. 7. For obvious reasons, the rails and the axis of revolution of face plate 70 are parallel to each other. This advance moves cone 61 and piston 62 into the cylinder in opposition to the air pressure in the cylinder. This movement is continued during the milling operation and reduces the total volume in the cylinder occupied by the low pressure air and raises the pressure in the low pressure system. Since pressure reducer 15 acts as a check valve, the air displaced from cylinder 63 flows by way of conduits 65 and 116 into the low pressure compartment in frame 10. The total volume of the low pressure compartment is made several times that of the cylinder, perhaps greater by a factor of ten or more, so that the net change in volume or pressure is very small. In this manner, the air pressure on piston 62 is maintained at a substantially constant value regardless of the position of the piston along the length of cylinder 63. This relative constancy of the force exerted by cone 61 on the end of the pipe allows the force exerted by the cone to be regulated to an acceptable value and eliminates the possibility that the force would be increased to a point where the pipe could be damaged as would be the case were the air pressure materially increased as piston 63 moves rearwardly into cylinder 63.

It will be apparent that various changes in the detailed construction and arrangement of the elements of the field lathe may be made by persons skilled in the art without departing from the spirit and scope of the present invention. Accordingly, it is intended that the description of the preferred embodiment of the lathe be considered as typical of, rather than limitative upon, the features of novelty therein.

I claim:

1. In a lathe, the combination comprising:
 a load-carrying frame having a plurality of hollow structural members interconnected for forming a heat exchanger with a continuous air passage;
 means for connecting the passage to a source of compressed air;
 a compressed air motor mounted on the frame;
 conduit means for conveying air under pressure from the passage to the motor for driving the motor;
 said heat exchanger being adapted to cool the entering air by heat transfer to the surrounding atmosphere and thereby condense moisture in the air; and
 a drain valve for draining condensed moisture from a low point of said passage.

2. The combination of claim 1 in which said conduit means is connected to the air passage at a high point thereof.

3. In a lathe, the combination comprising:
 a load-carrying frame having a first plurality of hollow structural members interconnected to form a heat exchanger with a first continuous air passage and a second plurality of hollow structural members interconnected to form an air chamber with a second continuous air passage isolated from the first mentioned air passage; and
 means for introducing air from said heat exchanger into said air chamber at a reduced pressure.

4. The combination according to claim 3 including:
 air-pressure actuated work-engaging means on said frame; and
 valve controlled conduit means connecting the work-engaging means to said air chamber for supply of operational air to the work-engaging means.

5. The combination according to claim 3 including:
 a workpiece centering cone;
 an air actuated piston and cylinder on said frame for moving the cone toward and away from the workpiece; and
 conduit means connecting the cylinder to said air chamber for supply to the cylinder of operating air.

6. The combination according to claim 5 wherein:
 the volume of said air chamber is several times larger than the volume of the cylinder whereby movement of the cone and piston relative to the cylinder in a direction to reduce the cylinder volume maintains air pressure on the piston substantially constant.

7. The combination according to claim 1 including:
 a housing on said frame;
 a face plate carrying a cutting tool and rotatably mounted on the housing within an opening defined by a wall of the housing, the face plate having small clearance with the wall of the housing;
 drive means drivingly connecting said motor to the face plate; and
 means for conducting exhaust air discharged from the motor into the housing for discharge therefrom through said clearance whereby particulate matter produced at the cutting tool is prevented from entering the housing.

8. The combination according to claim 7 including:
 means for supplying a lubricant to the air supplied to said motor; and
 the lubricant laden air exhausts from said motor toward said drive means for lubrication thereof.

9. In a lathe, the combination comprising:
 a housing;
 a face plate carrying a cutting tool and rotatably mounted on the housing within an opening in a wall of the housing, the face plate having small clearance with the wall of the housing;
 an air motor within said housing;
 a gear train connecting said motor and face plate for rotation of said face plate by said motor;
 said motor having an inlet for connection to a source of lubricant laden air for operating said motor and an outlet through which the air exhausts from said motor into said housing toward said gear train so as to deposit lubricant on said gear train; and
 said air escaping from the housing through said clearance whereby particulate matter produced at the cutting tool is prevented from entering the housing.

10. The combination according to claim 9 wherein:
 said gear train includes a driven gear attached to the face plate and a drive gear driven by said motor and engaging the driven gear.

11. In a lathe, the combination comprising:
 an elongate normally horizontal frame having a plurality of hollow tubular members defining a heat exchanger with a continuous air passage, certain of said members being horizontal rails,
 a head stock on said frame including a driven member rotatable on an axis parallel to said rails and an air motor for driving said driven member,
 a carriage movable along said rails,
 said passage having an inlet for connection to a source of air under pressure,
 means for conveying air from said passage to said motor for driving said motor, and
 said heat exchanger being adapted to cool and thereby condense moisture from the entering air by heat transfer to the surrounding atmosphere, whereby said motor receives dry air from said heat exchanger.

12. The combination according to claim 11 wherein:
 said tubular frame members also define an air chamber separate from said air passage,
 means for conveying air at regulated pressure from said heat exchanger to said air chamber,
 said head stock includes a work piece centering member on said rotation axis and a cylinder and piston for moving said centering member along said axis, and
 means for conveying air from said air chamber to said cylinder for pressurizing said cylinder to urge said centering member against a work piece.

13. The combination according to claim 11 including:
 a drain valve for draining condensed moisture from a low point of said passage.

References Cited

UNITED STATES PATENTS

| 1,823,975 | 9/1931 | Ferris | 82—32X |
| 2,346,045 | 4/1944 | Newlon | 82—4.3X |
| 2,916,749 | 12/1959 | Ingwer et al. | 10—106 |
| 3,304,051 | 2/1967 | Calhoun | 77—55.3 |

FOREIGN PATENTS

| 524,253 | 4/1956 | Canada | 82—4.3 |

LEONIDAS VLACHOS, Primary Examiner

U.S. Cl. X.R.

82—2.5, 28; 165—41